United States Patent [19]

Stenström

[11] Patent Number: 4,476,513

[45] Date of Patent: Oct. 9, 1984

[54] SURGE ARRESTER

[75] Inventor: Lennart Stenström, Ludvika, Sweden

[73] Assignee: ASEA Aktiebolag, VasterÅs, Sweden

[21] Appl. No.: 331,217

[22] Filed: Dec. 16, 1981

[30] Foreign Application Priority Data

Dec. 19, 1980 [SE] Sweden ................................ 8008984

[51] Int. Cl.³ ................................................ H02H 9/04

[52] U.S. Cl. .................................... 361/127; 361/130; 315/36

[58] Field of Search ............... 361/127, 126, 128, 130, 361/117, 132, 120; 315/36; 313/231.1, 325; 338/21, 20

[56] References Cited

U.S. PATENT DOCUMENTS

| | | | |
|---|---|---|---|
| 2,032,566 | 3/1936 | Earle | 361/130 X |
| 4,276,578 | 6/1981 | Levinson et al. | 361/127 |
| 4,326,232 | 4/1982 | Nishiwaki et al. | 361/126 X |
| 4,363,069 | 12/1982 | Crucius | 315/36 X |

FOREIGN PATENT DOCUMENTS

| | | | |
|---|---|---|---|
| 54-66443 | 5/1979 | Japan | 361/127 |
| 215001 | 8/1941 | Switzerland | 361/130 |

*Primary Examiner*—Patrick R. Salce

*Attorney, Agent, or Firm*—Watson, Cole, Grindle & Watson

[57] ABSTRACT

A surge arrester comprises two or more surge arrester units which are electrically series-connected between a top terminal and a bottom terminal. Each surge arrester unit comprises a stack of metal oxide varistor blocks, the latter being distributed within the surge arrester so that the number of varistor blocks per unit length in the surge arrester unit which is nearest the bottom terminal is less than in the surge arrester unit which is nearest the top terminal. This enables a more even temperature distribution to be achieved throughout the length of the surge arrester especially in the case where the surge arrester is located where it is subjected to long-term external fouling or pollution.

5 Claims, 3 Drawing Figures

SURGE ARRESTER

BACKGROUND OF THE INVENTION

1. Field of the Invention

This invention relates to a surge arrester of the kind comprising a top terminal, a bottom terminal and at least two surge arrester units, each surge arrester unit comprising an electrically insulating housing, provided with matallic flange means, and a plurality of electrically series-connected metal oxide varistor blocks arranged in a vertical stack in the electrically insulating housing, and the metallic flange means at the joint between each adjacent pair of surge arrester units forming a galvanic connection between the varistor stacks and the outer surfaces of the electrically insulating housings. In particular, but not exclusively, the invention relates to a zinc oxide surge arrester in which the metal oxide varistor blocks comprise zinc oxide varistor blocks.

2. Description of the Prior Art

In contrast to the varistor blocks in a conventional surge arrester having silicon carbide (SiC) blocks and series-connected spark gaps, the varistor blocks in a zinc oxide (ZnO) surge arrester (with or without spark gaps) are continuously subjected to a certain operating voltage when the surge arrester is connected into a network which is under voltage. The surge arrester must be dimensioned so that this voltage stress, to which the ZnO blocks are continuously subjected during normal operation, does not exceed a predetermined value at any place in the surge arrester.

The voltage distribution along ZnO surge arresters of known design is substantially determined by the self-capacitances of the varistor blocks, by the leakage capacitances of the blocks to ground, and by a grading ring normally arranged at the top of the surge arrester. The main purpose of providing a grading ring in a ZnO surge arrester is to improve the evenness of the voltage distribution along the surge arrester which would otherwise be more uneven due to the aforementioned leakage capacitances. However, a completely even distribution cannot be achieved with such a known design, and, accordingly, there is always a higher voltage stress at the upper part of the known design of surge arrester than at the lower part thereof.

The active parts (e.g. metal oxide varistor blocks) of a surge arrester for outdoor use are usually enclosed in an electrically-insulating, porcelain housing with metallic end flanges. For reasons of manufacturing technique, such a porcelain housing cannot be made too long. Surge arresters for voltages higher than about 150 kV are therefore usually built up of two or more surge arrester units mounted on top of each other. Moreover, by constructing a surge arrester with several shorter porcelain housings, a higher short-circuit safety can be obtained since pressure relief can be arranged at each joint between the surge arrester units. However, in these so-called multi-unit surge arresters the leakage capacitances of the joints to earth will contribute further to an uneven distribution of the voltage along the surge arrester, and thus contribute to the top unit becoming relatively more highly stressed than the other lower unit or units.

It has been found that a ZnO surge arrester, consisting of several series-connected surge arrester units, will have an unevenly distributed temperature increase when exposed to long-term external fouling or pollution, e.g. salt deposition on the electrically-insulating housing. This is due to a considerable leakage current flowing along the pollution layer formed on the external surface of the electrically-insulating housing and which in moist condition, is electrically conducting, with the result that there are often great fluctuations in the potential on the metallic flanges of the joints between adjacent surge arrester units. However, by measurements it has been established that, in most cases of heavy external fouling, the pollution layer on the surface of the electrically-insulating housing functions as an unsymmetrical outer control chain which gives a lower relative stress on the surge arrester unit which is placed lowest, that is, a voltage distribution similar to that occurring in the clean condition.

Since the inner active parts of the surge arrester are in galvanic connection with the outer surface of the insulator housing, the voltage stress on the varistor blocks will be affected and may locally rise above the maximum value for which the surge arrester is dimensioned. Because of the great non-linearity (a small difference in voltage gives a great difference in current) of the ZnO blocks, the resistive leakage current through the blocks will then increase temporarily in parts of the surge arrester and cause an abnormal temperature increase in the blocks. Since the resistive leakage current of ZnO blocks is greatly temperature-dependent, the abnormal temperature increase will result in a further increase of the leakage current. This may successively lead to the varistor blocks being destroyed.

Different solutions have been proposed to overcome the above-mentioned problems. One proposal consists of using insulating joint attachments at the joints between the surge arrester units, so that in these places galvanic connection between the active parts of the surge arrester and the outer surface of the insulator housing is avoided. However, such a solution is difficult to apply in a practical design. Another proposal consists of parallel-connecting all the surge arrester blocks with a separate chain of control capacitors to achieve a more even voltage distribution in the same way as in surge arresters having spark gaps and silicon carbide blocks. It is true that such a capacitive control makes it possible to reduce the temperature increase, but, in order to reach acceptably low values, a high capacitance is required, which results in high costs.

SUMMARY OF THE INVENTION

According to the present invention, there is provided a surge arrester comprising a top terminal, a bottom terminal and at least two surge arrester units electrically connected in series between the top and bottom terminals, in which each surge arrester unit comprises an electrically insulating housing, provided with metallic flange means, and a plurality of electrically series-connected metal oxide varistor blocks arranged in a stack in the electrically-insulating housing, and in which the metallic flange means at the joint between each adjacent pair of surge arrester units form a galvanic connection between the varistor stacks and the outer surfaces of the electrically insulating housings, wherein the improvement comprises distributing the varistor blocks in such a way in the surge arrester that the number of varistor blocks per unit length in the surge arrester unit which is nearest the bottom terminal is less than the number of varistor blocks per unit length in the surge arrester unit which is nearest the top terminal.

By distributing the varistor blocks in this manner, so as to correspond in a better way to the voltage distribution along the surge arrester in a purely capacitive state, a more even voltage stress on the blocks is obtained during normal operating conditions. This makes it possible to utilize the varistor blocks more efficiently, enabling the surge arrester to be produced more cheaply, and, at the same time, to reduce the maximum voltage stress which occurs during normal operation either with clean (not fouled) electrically-insulating housings, e.g. porcelain insulators, or with electrically-insulating housings which have a dry (non-conducting) pollution layer. This reduces the risk of ageing of the varistor blocks, which usually occurs in case of too high a voltage stress. Furthermore, the ability of the surge arrester to manage fouling is improved. This improvement is due, among other things, to the fact that the distribution of the blocks between the different surge arrester units, as proposed according to the invention, corresponds in a better way to the substantially purely resistive voltage distribution which is caused by the fouled conditions.

BRIEF DESCRIPTION OF THE DRAWING

The invention will now be described, by way of example and in greater detail with reference to the accompanying drawing, in which.

DESCRIPTION OF THE PREFERRED EMBODIMENT

Figure 1:
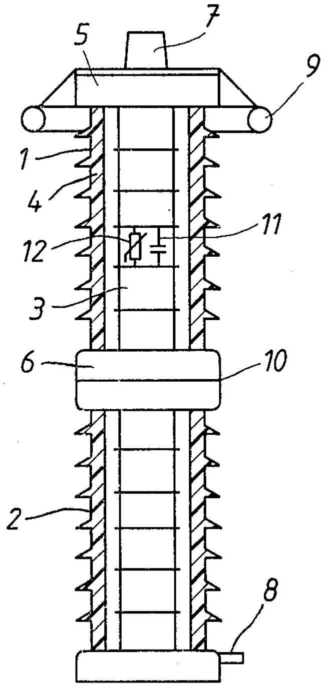
FIG. 1 PRIOR ART
FIG. 1 is a schematic, cross-sectional view of a prior art surge arrester comprising zinc oxide varistors.

The surge arrester shown in FIG. 1 consists of two electrically series-connected surge arrester units 1 and 2. Each surge arrester unit 1, 2 comprises a plurality of cylindrical zinc oxide varistor blocks 3 arranged in a stack which is arranged centrally in an elongated, porcelain, electrically-insulating housing 4 having metallic end flanges 5 and 6. The two surge arrester units are assembled coaxially, e.g. bolted coaxially together, and oriented with their longitudinal axes in the vertical direction. The surge arrester is provided with a top terminal 7 for connection to a voltage-carrying line and a bottom terminal 8 for connection to ground and has a grading ring 9 suspended from the upper end of the surge arrester. The metallic end flanges, at the joint 10 between the surge arrester units 1 and 2, form a galvanic connection between the varistor stacks of the two surge arrester units and the outer surfaces of the porcelain housings.

Figure 3:
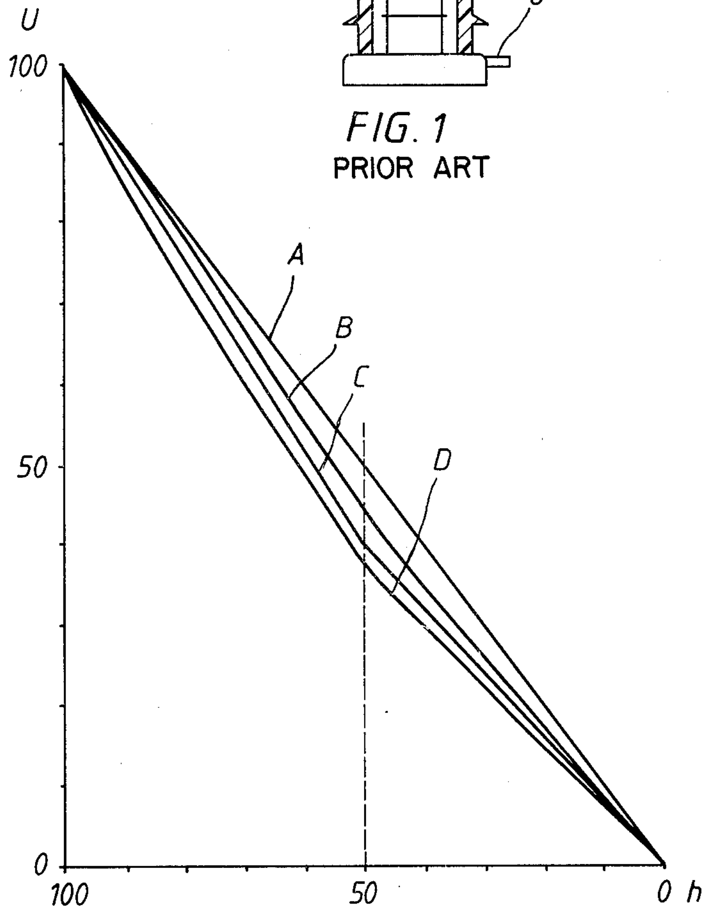
FIG. 3 shows the voltage distributions, in the longitudinal direction, for different surge arrester designs.

A ZnO varistor block has an equivalent circuit consisting of a capacitance 11 connected in parallel with a greatly voltage-dependent resistance 12. At normal operating voltage, the capacitive part of the leakage current is predominant and, if the equivalent capacitances 11 were allowed to act on their own, they would provide a purely linear voltage distribution along the surge arrester according to line A in FIG. 3, in which U designates the voltage in percentage of the total voltage across the surge arrester, and h designates the distance from the bottom end flange in percentage of the length of the surge arrester. However, between the surge arrester and ground, leakage capacitances are distributed which give an uneven distribution of the voltage along the surge arrester, so that a higher voltage will prevail across the upper part of the surge arrester than across the lower part of the surge arrester. The grading ring 9 brings about a certain improvement of this condition and the resultant voltage distribution for the surge arrester according to FIG. 1 is given by curve B in FIG. 3. Of course each of the curves A and B refers to a surge arrester in which the varistor blocks are evenly distributed per unit length between the two surge arrester units.

Figure 2:
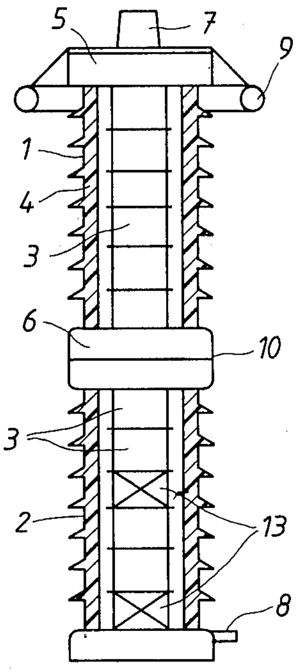
FIG. 2 is a schematic, cross-sectional view of a surge arrestor according to the invention.

FIG. 2 shows an example of one embodiment of a surge arrester according to the present invention where the same reference numerals as those used in FIG. 1 have been employed to designate similar parts of the two surge arresters. In the surge arrester shown in FIG. 2, there is an unsymmetrical distribution of varistor blocks 3 between the two, substantially similarly axially dimensioned surge arrester units 1 and 2, the upper surge arrester unit 1 comprising about 60%, and the lower surge arrester unit 2 about 40%, of the total number of varistor blocks in the two surge arrester units. Since the length of the lower porcelain electrically insulating housing in this case is not utilized in full because of the lower number of varistor blocks, electrically conducting spacers 13, for example each in the form of a hollow cylindrical body of aluminum or the like, have been provided as axial fillers in the varistor stack. These spacers 13 may advantageously be evenly distributed in the stack as shown in FIG. 2, but spacers may also or alternatively be concentrated at, or adjacent, one or both ends of the varistor stack. With a surge arrester according to FIG. 2, a voltage distribution according to curve C in FIG. 3 would be obtained if the effect of the leakage capacitances were not taken into consideration, which directly corresponds to the distribution of the blocks 3 between the surge arrester units 1 and 2. Curve D shows the voltage distribution which occurs in reality when the effect of the leakage capacitances is taken into consideration. As can be seen, the difference between the distribution of the blocks and the actual voltage distribution will be smaller with the surge arrester according to FIG. 2 (curves C and D) than with the surge arrester according to FIG. 1 (curves A and B). The overvoltage compared with the ideal distribution is about 12% for each varistor element in the top portion according to curves A and B, wheras according to curves C and D the overvoltage amounts to only about 5%.

Tests have shown that curve D also coincides well with the outer voltage distribution in case of long-term and severe fouling of a surge arrester according to the present invention. As will be seen from FIG. 3, if the varistor block distribution 50/50 had been maintained between the surge arrester units, the top unit would have been subjected to a much higher overvoltage than if the varistor blocks had been unsymmetrically distributed between the units as in a surge arrester according to the present invention.

The invention is not limited to the shown embodiment of a two-unit surge arrester but also, of course, covers surge arresters having three or more stacked surge arrester units. For a surge arrester having more than two units, the number of varistor blocks per unit length in the units may increase successively with the height of the surge arrester units in the surge arrester. However, the invention also comprises such a multi-unit surge arrester in which the number of varistor blocks per unit length is equal for all units, except the bottom varistor unit which contains fewer blocks per unit length.

What is claimed is:

1. A surge arrester comprising a top terminal, a bottom terminal and at least two surge arrester units electrically connected in series between said top and bottom terminals, each said surge arrester unit comprising an electrically insulating housing with metallic flange means, a plurality of electrically series-connected metal oxide varistor blocks arranged in a stack in the electrically-insulating housing, said metallic flange means forming a joint between each adjacent pair of surge arrester units forming a galvanic connection between the varistor stacks and the outer surfaces of the electrically insulating housings, the varistor blocks being distributed such that the number of varistor blocks per unit length in the surge arrester unit nearest said bottom terminal is less than the number of varistor blocks per unit length in the surge arrester unit nearest said top terminal.

2. A surge arrester according to claim 1, in which there are at least three electrically series-connected surge arrester units and in which the number of series-connected varistor blocks per unit length is less in the surge arrester unit located nearest the bottom terminal than in any other one of the other surge arrester units.

3. A surge arrester according to claim 1, wherein with two electrically series-connected surge arrester units, the number of series-connected varistor blocks per unit length being at least 10% lower in the bottom surge arrester unit than in the top surge arrester unit.

4. A surge arrester according to claim 1, 2 or 3, in which at least one electrically conducting spacer is arranged, as an axial filler, in the varistor stack of the lowermost of the surge arrester units.

5. A surge arrester according to claim 4, in which each electrically conducting spacer comprises a hollow, cylindrical metallic spacer.

* * * * *